J. G. P. THOMAS.
DRIVING OF ROAD AND RAIL VEHICLES.
APPLICATION FILED APR. 7, 1915.
1,203,664.
Patented Nov. 7, 1916.
2 SHEETS—SHEET 2.
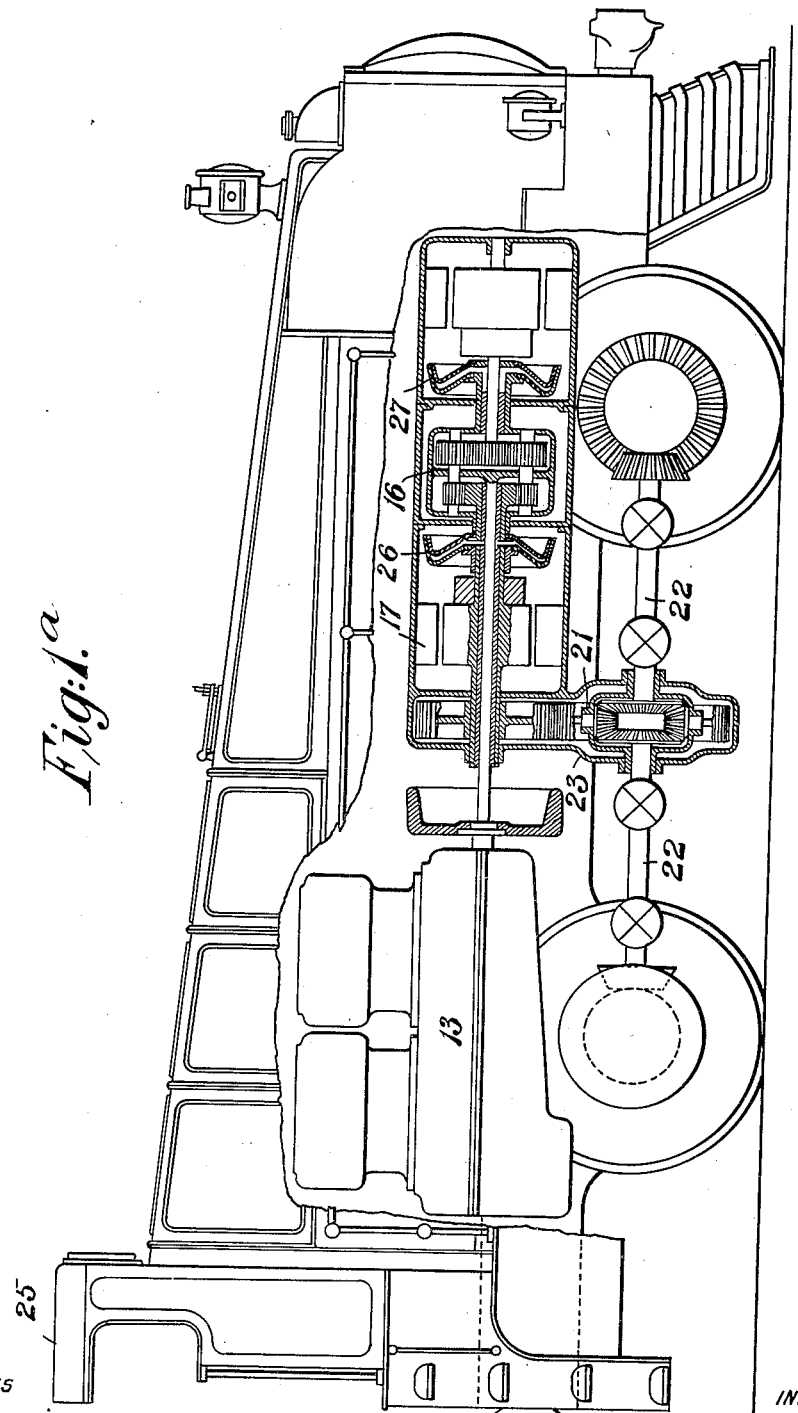
Fig.1.ª
WITNESSES
INVENTOR
John Godfrey Parry Thomas.
per. Herbert Sefton Jones
Attorney.

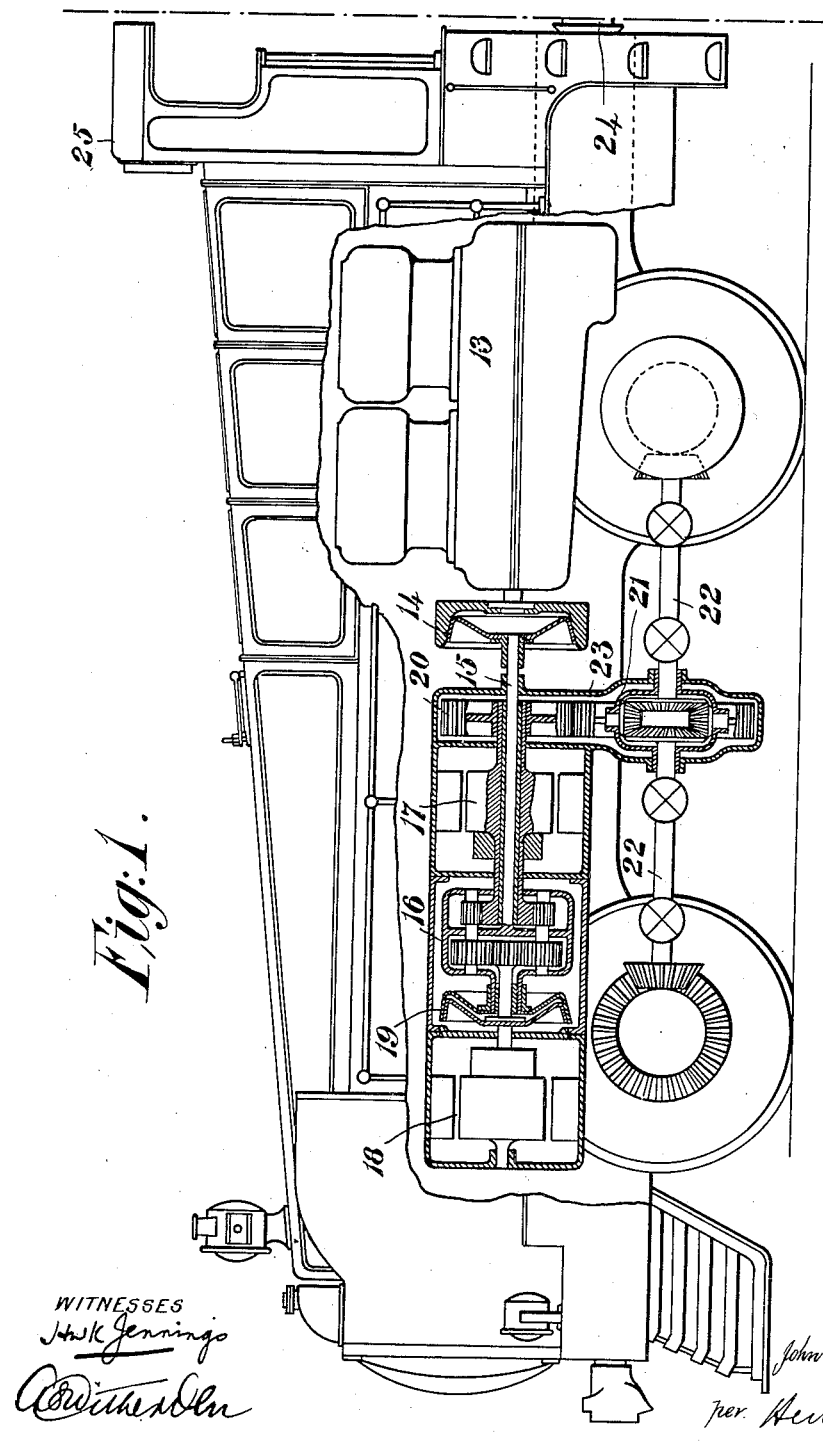

UNITED STATES PATENT OFFICE.

JOHN G. P. THOMAS, OF KENSINGTON, LONDON, ENGLAND, ASSIGNOR TO THOMAS FOREIGN PATENTS LIMITED, OF LONDON, ENGLAND, A CORPORATION OF GREAT BRITAIN.

DRIVING OF ROAD AND RAIL VEHICLES.

1,203,664.  Specification of Letters Patent.  Patented Nov. 7, 1916.

Application filed April 7, 1915. Serial No. 19,835.

*To all whom it may concern:*

Be it known that I, JOHN GODFREY PARRY THOMAS, a subject of the King of Great Britain, residing at 14 Leonard Place, High street, Kensington, in the county of London, England, have invented new and useful Improvements in the Driving of Road and Rail Vehicles, of which the following is a specification.

This invention is concerned with power transmission mechanism on vehicles wherein an electric generator receives energy mechanically from the prime motor, and conveys it electrically to an electric motor geared to the vehicle wheels.

One purpose of the invention is to secure such a disposition of the component machines of power transmission mechanism of this class upon the vehicle as will cause their weight to be borne by just those axles which the mechanism drives.

A further purpose of the invention is to provide for the accommodation of a convenient flexible driving connection between the power transmission mechanism and the vehicle axles while yet securing the advantageous distribution of weight just referred to. To this end instead of the generator being located as usual next to the prime motor which drives it, the electric motor connected to the wheels is placed between the prime motor and generator, the machines being in line and its armature rotates freely about the shaft by which power is transmitted to the generator.

The weight of the three machines is fairly distributed over the two axles which support them, and the motor is then in convenient position above but between the axles for driving a gear member beneath it, between which and the axles there is room for a suitable flexible driving connection.

The invention therefore comprises the combination upon a vehicle of a prime motor, an electric motor and an electric generator, disposed in alinement in the order named, the generator being driven by the prime motor and itself supplying electric power to the motor, this last being geared to the vehicle wheels.

For vehicles of very large power this arrangement is duplicated, each set being arranged upon a single truck and the two trucks are suitably connected.

It is preferred that the gearing connection to the wheels should be located adjacent to the prime motor, and it may comprise a gear wheel upon the electric motor shaft meshing with the center member of a differential gear supported beneath it, preferably in the same gear casing, the side members of the differential gear driving the two axles of the vehicle through Cardan shafts.

By way of example the invention is hereinafter explained in detail with reference to the accompanying drawing in its application to an electromechanical power transmission system of the kind indicated in which the three component machines of the mechanism are interconnected by a balance gearing. This particular system is in itself well known, being described in my former United States Patent No. 948436, and consequently its distinctive features form no part of the subject of this application.

The drawing shows a side elevation of a large power vehicle in which the elements of the transmission mechanism are drawn in section.

Figure 1 shows one half of said vehicle; and Fig. 1ᵃ shows the other half with a modification of the gearing.

Considering the left hand side of the figure, 13 represents the prime motor which is joined through a clutch 14 and shaft 15 to the planet carrier 16 of the planetary gear. The larger sun wheel of this gear is joined to the sleeve shaft of the second electrical machine 17 and the smaller sun wheel is joined to the shaft of the first electrical machine 18. A clutch 19 enables the planet carrier to be joined to the shaft of the small sun wheel thus locking the gear. The wheels are driven from the transmission system, *i. e.*, at low speeds from the second electrical machine 17, and at top speed direct from the prime motor, through a gear wheel 20 arranged on the shaft of the machine 17 and gearing with the center member 21 of a balance gearing the side members of which are joined through Cardan shafts 22 to the respective axles of the vehicle. The balance gear 21 may conveniently be supported in a casing 23 integral with that which surrounds the gear wheel 20 and formed upon or attached to the casing of the second electrical machine.

A similar prime motor and transmission system is arranged upon a second truck such as that shown to the right of the figure and the two vehicles are joined by a suitable coupling 24. A driver's cab 25 is built partially on each vehicle.

If desired the control apparatus for the whole system may be duplicated within the two parts of the cab so that the two vehicles may be separated and used as separate locomotives when convenient.

The invention is not limited to the precise arrangement described. One of the possible modifications is illustrated on the right hand side of the figure although naturally the two portions of a locomotive would in practice be made identical. In this case the clutch 26 for freeing the engine which corresponds with the clutch 14 is arranged between the machine 17 and the planetary gearing 16.

What I claim is:

1. In an automobile vehicle the combination of a prime motor, an electric generator driven thereby, an electric motor receiving power electrically from said generator, located in line with said prime motor and generator and between them, and gearing connection from said electric motor to the vehicle wheels.

2. In an automobile vehicle the combination of a prime motor, an electric generator driven thereby, an electric motor receiving power electrically from said generator, located in line with said prime motor and generator and between them, and gearing connection from said electric motor to the vehicle wheels located between the motor and the prime motor.

3. In an automobile vehicle the combination with a pair of axles, of a prime motor, an electric generator driven thereby, an electric motor located between the prime motor and the generator and in line with them, the weight of all three machines coming upon the said pair of axles, a differential gear, shafts connecting the said members of said gear with respective vehicle axles, and a driving connection between said electric motor and the center member of said differential gear.

4. In an automobile vehicle the combination with a pair of vehicle axles, of an electromechanical power transmission system borne by the said axles, and comprising a prime motor, an electric generator driven thereby and an electric motor located between said prime motor and generator, a gear casing attached to the casing of said motor, a gear wheel within said casing upon the motor shaft, a differential gear within and supported by said casing and driven by said gear wheel, and connections between the side members of said differential gear and the respective vehicle axles.

5. An automobile vehicle comprising two trucks, a prime motor upon each truck driving the axles thereof through electromechanical transmission mechanism and a driver's cab supported upon the two trucks.

6. In an automobile vehicle the combination with a pair of axles of the prime motor, an electric generator driven thereby, an electric motor receiving power electrically from said generator, all three of said machines being located in line and their weight distributed upon said axles, a gearing member beneath said machines and driven thereby and located between said axles, and a flexible driving connection between said member and one of said axles.

7. In an automobile vehicle, the combination with a pair of axles of a prime motor, an electric generator, a shaft connecting said prime motor to said generator to drive the same, an electric motor receiving driving power from the generator located between said generator and the prime motor and surrounding the shaft driving said generator, the weight of said three machines being distributed over the pair of axles, a gear member on the motor shaft approximately midway between said axles, a Cardan shaft driven by said gear member and driving the vehicle wheels and means for procuring a direct mechanical drive from the prime motor to the wheels.

In testimony whereof I have signed my name to this specification in the presence of two subscribing witnesses.

J. G. P. THOMAS.

Witnesses:
 A. E. ODELL,
 LEONARD E. HAYNES.